Aug. 20, 1957 R. P. FISHER 2,803,145
TRANSMISSION MECHANISM FOR DRIVING SHAFTS
AT RIGHT ANGLES TO EACH OTHER
Filed April 15, 1954
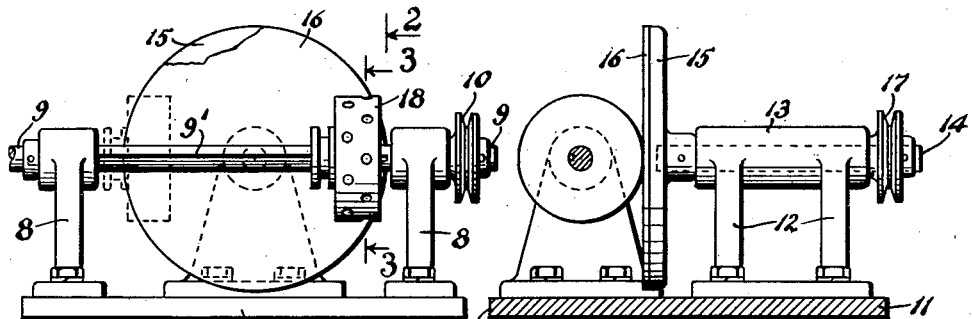
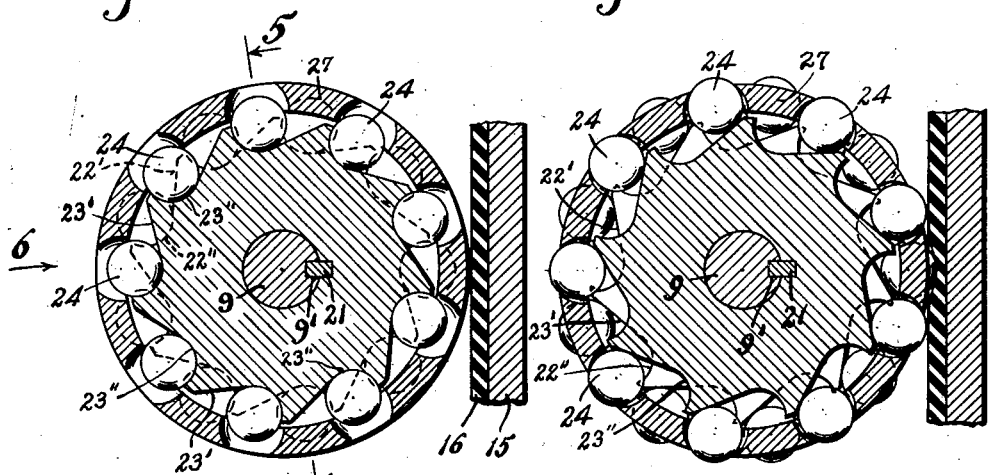
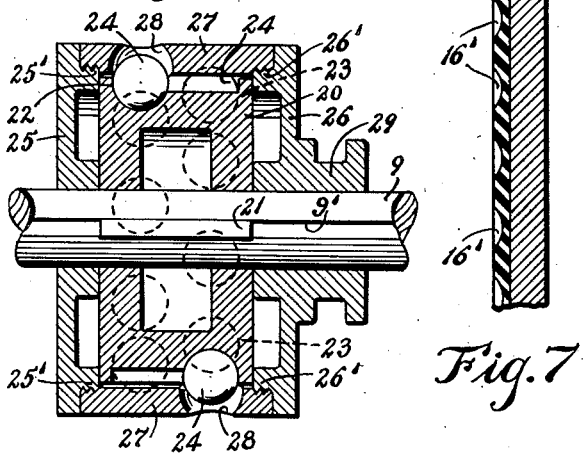
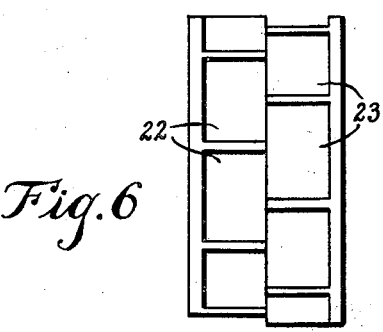
INVENTOR.
Robert P. Fisher
BY
ATTORNEY.

United States Patent Office 2,803,145
Patented Aug. 20, 1957

2,803,145

TRANSMISSION MECHANISM FOR DRIVING SHAFTS AT RIGHT ANGLES TO EACH OTHER

Robert P. Fisher, Los Angeles, Calif.

Application April 15, 1954, Serial No. 423,300

7 Claims. (Cl. 74—351)

This invention relates to transmission mechanism for driving shafts at right angles to each other, and particularly to a new transmission mechanism for transmitting power from a drive shaft to a driven shaft, and in which different speeds can be transmitted to the driven shaft, and also reversal of the direction of rotation of the driven shaft by the bodily movement of the driving member relative to the driven shaft.

Among the salient objects of the invention are:

To provide a power transmitting member in which steel balls are held therein and are movable outwardly and inwardly relative to the periphery of said driving member, whereby said balls are brought into driving engagement with the driven member for driving it.

To provide in such a mechanism a housing or cylinder having openings through its wall, with an operating member therein having angular cam surfaces, with balls resting thereon, to be forced outwardly in said openings as said operating member is turned on its axis, said operating member being mounted on a drive shaft.

To provide in such a mechanism a pair of cylindrical holding members having openings through their peripheral walls, said openings being staggered circumferentially, with operating members in said holding members having cams in staggered relationship around said operating members, whereby to simultaneously move said steel balls outwardly into driving engagement with a driven member.

To provide as a driven member on a shaft to be driven, a disc having a face adapted and designed to have said steel balls forced into driving engagement with its face, at one side of its axis, for driving it.

To provide in a mechanism of the character referred to a drive shaft and a driven shaft at right angles to each other, said driven shaft having a driving disc-like member thereon, and said drive shaft having a cylindrical driving member thereon, movable across the face of said disc-like member and in driving engagement therewith, said cylindrical driving member having steel balls in its periphery with means within said driving member for forcing said steel balls outwardly into driving engagement with said disc-like member.

In order to explain my invention more in detail, I have shown on the accompanying sheet of drawings, one practical embodiment thereof, which I will now describe:

Figure 1 is a front elevation of a mechanism embodying my invention;

Figure 2 is a side elevation thereof;

Figure 3 is a sectional view through the driving member, taken on the line 3—3 of Fig. 1;

Figure 4 is a similar view showing the steel balls forced out through the openings in their housing to engage and drive a driven member;

Figure 5 is a sectional view taken on line 5—5 on Fig. 3; and

Figure 6 is a plan view looking into the cam surfaces showing the staggered relationship thereof, and Figure 7 is a sectional view of a portion of the disc, showing indents to receive the steel balls for driving said disc.

Referring now in detail to the drawings, any kind of supporting base or platform, such as 7, 7, can be used, with upright supports 8, 8, through which a driving shaft 9 is shown, said shaft 9 having therein a keyway or channel 9', and having on its end a driving pulley 10.

Said base in the present showing, Fig. 2, has a right-angle portion 11, with upright bearing supports 12, 12, and a bearing sleeve or body 13, supported thereon, as indicated. In this bearing body 13 is a driven shaft 14, having on one end a disc-like member 15, having its face provided with a somewhat flexible member 16, which can be of any suitable material, and into driving engagement with which steel balls can be moved for the purpose of driving said disc-like member and its shaft 14. On the opposite end of said driven shaft is shown a pulley 17 from which power can be taken. Said disc-like member can have its face provided with suitable ball-receiving recesses or sockets, as indicated in Fig. 7, which recesses or sockets, designated 16', 16', are arranged for the balls of the driving member to register therewith and to enter said recesses in order to make a more positive driving engagement.

I will now describe my driving member, designated as a whole 18, as seen in edge elevation in Fig. 1.

Referring particularly to Fig. 5, an operating or driving member or body, as 20, is provided, on the driving shaft 9, with key 21 in said body to slide in the channel or keyway 9' in the drive shaft 9.

The outer face of said operating member 20 is provided with two series of cam sockets, as 22 and 23, staggered circumferentially relative to each other, as indicated in Fig. 6. These cam sockets are substantially of the form indicated in Figs. 3 and 4, having a longer cam surface, as 22' and 23', and ball-receiving seats, as 22" and 23", the steel balls, designated 24, being seen resting in said seats in Fig. 3, having been moved outwardly by the cam surfaces in Fig. 4, whereby to engage the face of the disc-like member for driving it.

At opposite sides of said operating or driving body are two side plates or heads, as 25 and 26, having threaded annular lugs 25' and 26' to be screwed into a container band or cylinder 27, having openings therethrough, designated 28, 28, and being of round form and of a size to permit the steel balls to be forced partially therethrough, as indicated in Fig. 4.

Said side plate or head 26 is shown provided with a spool-like portion 29, to receive a fork or yoke (not shown) for shifting said driving member 18 back and forth across the face of said disc for driving it and its shaft.

As said driving member 18 is moved toward the center of the disc, the speed of the disc is increased, and if it is moved across the center of said disc, the direction of rotation is reversed. This movement is old in principle, but so far as I know the use of steel balls in making the driving engagement in such an arrangement is new.

The means for moving the driving member will be such as is required for the particular use to which the invention is to be put.

The cam faces or surfaces 22' and 23' can be slightly concaved, as seen in Fig. 5, to better hold the steel balls in place and to guide them in and out.

As the driving member is moved on the face of the disc, with the balls in engagement therewith, said balls turn, thus making the movement of said operating member 18 easier as it is moved on the driving shaft 9, for changing the speed of the driven member, or for reversing the direction of rotation of said driven member.

I am aware that changes in the details of construction and arrangement of the invention here illustrated can be

I claim:

1. In a power transmission mechanism for driving two shafts one from the other, a drive shaft and a driven shaft operatively supported at right angles to each other, a disc on said driven shaft for driving it, a cylindrical driving member on said drive shaft, and movable thereon back and forth across the face of said disc, said cylindrical driving member having openings through its wall, a cam member slidably secured to said drive shaft within said cylindrical member, said cam member having angular cam surfaces around its outer edge, and a plurality of steel balls on said cam surfaces and positioned to be moved thereby outwardly through the openings in said cylindrical member and into driving engagement with said disc for driving it, means for driving said drive shaft and means for moving said cylindrical member with said cam member and said steel balls back and forth on said drive shaft to change its driving engagement with said disc.

2. A power transmission mechanism as set forth in claim 1 in which two cam members are used in said cylindrical member with cam surface staggered circumferentially with steel balls on all of said cam surfaces.

3. A power transmission mechanism as set forth in claim 1 in which said disc has its face provided with a slightly flexible member for said steel balls to engage and slightly indent to give better driving engagement therewith.

4. A power transmission mechanism as set forth in claim 1 in which said cam member has angularly positioned cam surfaces and each surface terminates in a ball seat inwardly, whereby as said cam member is turned the cam surface forces each ball outwardly and partially through the opening in the cylindrical wall of said driving member.

5. In a power transmitting mechanism: a driving member with means for driving it, a driven member of disc-like form secured to a shaft which is at right angles to the axis of said driving member, said driving member being of cylindrical form and movable axially transversely across the face of said driven member, a series of steel balls shiftably carried by said driving member and movable outwardly relative thereto and into driving engagement with the face surface of said driven member for driving it, and means operated by the turning of said driving member to move said balls into driving engagement with said driven member, and means for moving said driving member back and forth across the face of said driven member.

6. In a power transmitting mechanism; a driving member with means for driving it, a driven member of disc-like form secured to a shaft which is at right angles to the axis of said driving member, said driving member being of cylindrical form and movable axially transversely across the face of said driven member, a cam member within said cylindrical driving member with cam surfaces around its outer edge adjacent the inner surface of said cylindrical form, a series of steel balls interposed between said cam surfaces on said cam member and said driving member, the driving member having openings therein through which said balls can be moved to project beyond the face surface of said driving member and into driving engagement with said driven member, and means for moving said cam and driving members back and forth across the face of said driven member to vary the speed transmitted to said driven member and for reversing the direction of rotation of said driven member.

7. A power transmitting mechanism as set forth in claim 6 in which said disc-like driven member is provided on its face with recesses to receive said balls to make a more positive driving engagement therewith.

References Cited in the file of this patent

UNITED STATES PATENTS

| | | |
|---|---|---|
| 667,659 | Keiper | Feb. 5, 1901 |
| 671,826 | Johnston | Apr. 9, 1901 |
| 684,215 | Foster | Oct. 8, 1901 |
| 723,228 | Banwell | Mar. 24, 1903 |
| 870,715 | Cowles | Nov. 12, 1907 |
| 1,129,651 | Lukacsevics | Feb. 23, 1915 |

FOREIGN PATENTS

| | | |
|---|---|---|
| 22,959 | Great Britain | 1906 |
| 607,628 | France | Apr. 3, 1926 |